United States Patent [19]
Rath, Jr.

[11] 3,876,037
[45] Apr. 8, 1975

[54] LIQUID LEVEL SENSING DEVICE
[75] Inventor: Harry B. Rath, Jr., Allentown, Pa.
[73] Assignee: The Nycal Company, Inc., Carlstadt, N.J.
[22] Filed: July 30, 1973
[21] Appl. No.: 383,834

[52] U.S. Cl. .................. 184/6.4; 73/295; 137/392; 184/103 R
[51] Int. Cl. ........................................... F01m 11/10
[58] Field of Search ............. 184/103 R, 105 R, 6.4; 123/196 S; 73/295; 307/118; 137/392; 340/244 R

[56] References Cited
UNITED STATES PATENTS

| | | | |
|---|---|---|---|
| 3,222,578 | 12/1965 | Thiele | 73/295 |
| 3,391,547 | 7/1968 | Kingston | 137/392 X |
| 3,407,840 | 10/1968 | Finnegan | 137/392 |
| 3,461,446 | 8/1969 | Sergeant | 137/392 X |
| 3,477,460 | 11/1969 | Dotto | 137/392 |
| 3,792,456 | 2/1974 | Hill | 73/295 |

FOREIGN PATENTS OR APPLICATIONS

| | | | |
|---|---|---|---|
| 1,172,870 | 6/1964 | Germany | 73/295 |

Primary Examiner—Manuel A. Antonakas

[57] ABSTRACT

A liquid level sensing device intended to sense the level of oil in an engine crank case with means for filling the case with oil from a reserve tank if the oil level is below a desired level. The sensing device is a thermistor having a negative coefficient of resistance. It is wired to a bridge circuit containing a Zener diode for a voltage reference. The circuit is operated by a manual push button and an SCR made conductive. If the oil level is below the desired level, a solenoid valve opens a conduit to a reserve tank and the crank case is automatically filled.

1 Claim, 2 Drawing Figures

LIQUID LEVEL SENSING DEVICE

BACKGROUND OF THE INVENTION

Modern automobile engines require a considerable amount of oil in the engine crank case for efficient operation. The oil level is generally measured by means of a dip stick positioned in a tube which connects with the crank case. In order to measure the oil level, the hood of the car must be opened and the dip stick withdrawn for inspection. Many devices, some including floats, have been designed and used to make the measurement of oil levels more convenient and automatic. Some of these devices only measure the oil level, others add oil to the crank case if the measurement indicates that oil is needed.

One of the features of the invention is the circuit which includes the thermistor sensor. It uses no current or other energy when not in use and is designed to cut off the power supply when the engine is started and oil pressure is generated.

Another feature of the invention is the convenience of the device when the reserve tank is installed in the cab of a truck and the push button is on the dash board. Oil in the crank case may be replenished by the driver without leaving his seat.

SUMMARY

The invention comprises a thermistor with either a positive or a negative coefficient of resistance positioned in the crank case of an engine at the desired oil level. A reserve oil tank is connected through a solenoid operated valve to the crank case for replenishing oil used by the engine. A control circuit is connected to the thermistor and includes a four-armed bridge circuit with the thermistor as one arm and a Zener diode as another arm. A manually operated push button switch activates a silicon controlled rectifier when the circuit is put into operation. If the thermistor senses a lack of oil, the solenoid valve is opened and oil flows from the reserve tank into the crank case until the oil level is raised to the desired level, then the valve is closed. When the engine is started again, the oil pressure switch returns the controlled rectifier to its normally nonconductive condition and the battery power us cut off.

Other features and additional details of the invention will be disclosed in the following description, taken in connection with the accompanying drawings.

DESCRIPTION OF THE PREFERRED EMBODIMENT

Figure 1:
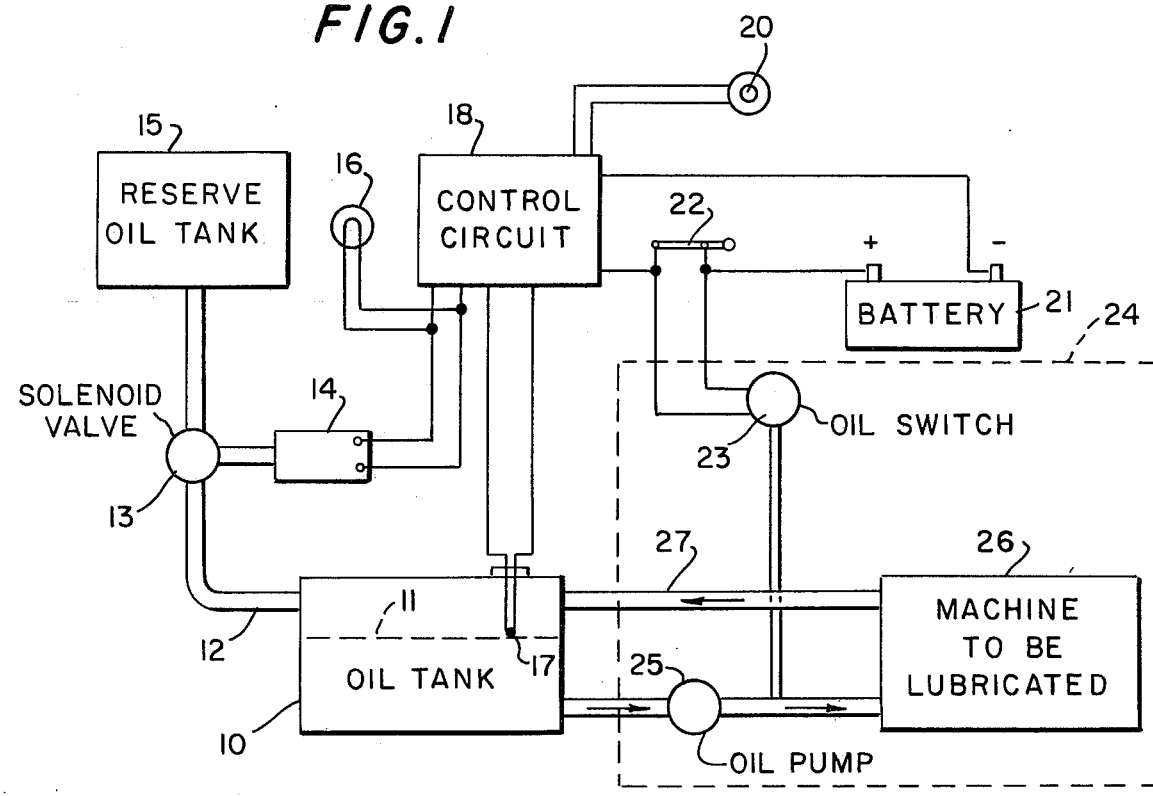
FIG. 1 is a schematic diagram showing the system components.

Referring now to FIG. 1, a liquid tank 10 is shown with a liquid, such as oil, filled to a desired level indicated by the dotted line 11. A filling pipe 12 is connected to the tank 10 in series with a normally closed valve 13 operated by an electric solenoid 14. The valve 13 is connected to a reserve tank 15 which is preferably made with transparent sides so that the level of liquid in the tank is visible. A lamp 16 is connected across the solenoid terminals to provide a visual indication when the valve 13 is open and liquid is flowing from the reserve tank 15 into the main oil tank 10.

The level of liquid in tank 10 is sensed by a thermistor 17, a well-known electrical component consisting of a bead of ceramic materials having a large temperature coefficient of resistance. Thermistors having either a positive or negative coefficient can be employed, the negative coefficient type is used in the diagram shown in FIG. 2. Its operation will be described later. The thermistor sensor 17 is connected to a control circuit 18 which energizes solenoid 14 and lamp 16 whenever a push button 20 is pressed and the sensor 17 is surrounded by air. The control circuit 18 is powered by a source of power 21 which may be a 12 volt battery as shown. A switch 22 is connected in series with the battery for disconnecting the power source. Switch 22 is also opened whenever it is desired to use an oil switch 23 for automatic operation.

The device as described above may be used with any liquid tank 10 to keep the tank filled to a desired level. When used in this simple application, all the equipment shown within the dotted lines 24 are not used. However, the sensing device has been designed for the specific purpose of maintaining the oil at a desired level in the crank case of an internal combustion engine, such as may be used in a truck or passenger car. Such an application includes an oil pipe to an oil pump 25, the motor parts to be lubricated 26, and a return oil line 27 to the tank 10 (in this application, the crank case).

The engines used in trucks and passenger cars normally include oil pumps which pump the oil through conduits to lubricate the pistons and other moving parts in or near the case. For this reason, the sensing device should not be used when the engine is running and to insure that it will not be used, the oil switch 23 is connected to the exit pipe of the oil pump and arranged to open the battery circuit whenever the running of the engine produces an oil pressure. When the oil switch is used switch 22 is kept open.

Figure 2:
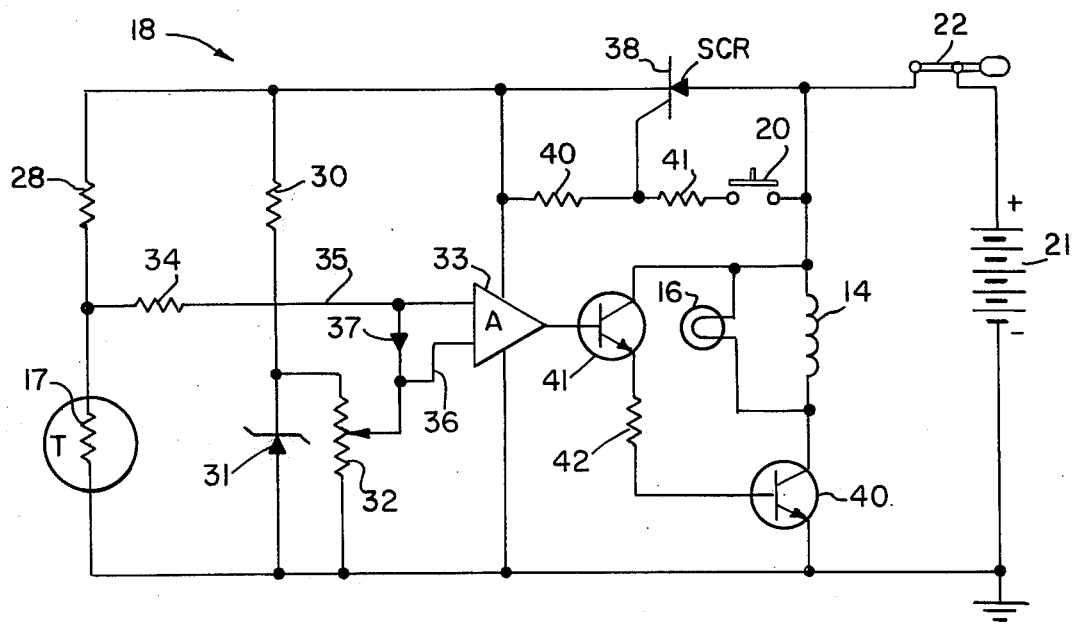
FIG. 2 is a diagram of connections of the control circuit used with the device.

The control circuit 18 shown in detail in FIG. 2, includes a four-armed bridge in which the thermistor 17 is one of the arms. Resistors 28 and 30 make up two other arms and a Zener diode 31 is the fourth arm. The Zener diode 31 is bridged by a voltage divider 32 which is adjusted prior to installation to compensate for variations in the Zener diodes and in the thermistors. The bridge balance is sensed by the input circuit to an amplifier 33 connected to opposite junction points of the bridge in series with a limiting resistor 34.

Values of resistors 28 and 30 are selected so that the bridge circuit is initially unbalanced because the resistance of the thermistor is too high. This condition applies a positive voltage to conductor 35 as compared to conductor 36 but the amplifier is not affected because the diode 37 short-circuits this voltage and the input voltage to the amplifier is zero. When the voltage is first applied to the circuit, the current through the thermistor heats it and gradually reduces its resistance, tending to bring the bridge nearer a balanced condition. If the thermistor is surrounded by oil, the heat is conducted away at a rapid rate and the resistance of the thermistor does not go below the balance condition of the bridge. If the thermistor bead is surrounded by air the temperature rises an additional amount and the bridge is unbalanced in the other direction. Conductor 35 is made more negative than conductor 36 and this negative voltage is applied to amplifier 33 causing an output voltage to be applied to the operating circuit.

The operating portion of control circuit 18 includes a silicon controlled rectifier (SCR) 38 connected in series with the positive line from the battery 21. The firing electrode is connected to a point in a voltage divider whose resistors 40 and 41 are connected in series with the terminals of push button 20. Solenoid 14 and lamp 16 are connected in parallel and in series with a power transistor 40, the emitter of which is connected to the negative side of the power supply. The base of transistor 40 is connected to the emitter of a second transistor 41 in series with a limiting resistor 42. When the amplifier receives no input signal, both transistors 40 and 41 are biased to cut-off and no current flows through the solenoid or the lamp. Also, when the SCR 38 is nonconducting, no current is applied to the bridge circuit and there can be no amplifier input, no matter what the oil level.

The circuit is put into operation by the manual closing of switch 20, thereby applying a firing voltage to the firing electrode of SCR 38 and causing it to conduct. The operator need only touch the button switch 20 for an instant because the SCR, as is well known, will continue to conduct once it has been fired. Positive potential is now applied to the amplifier 33 and the bridge circuit, causing the thermistor to take current, start to increase its temperature, and start to lower its resistance. If the oil level is below the thermistor, the resistance of the thermistor will change by a large amount, its resistance will be lowered so that the bridge is unbalanced in a reverse direction and the amplifier energized.

The amplifier now sends an output signal to transistor 41 causing it to conduct and applying a voltage to the base of power transistor 40 causing it to conduct also. Current through the collector-emitter circuit of transistor 40 activates the solenoid 14 and opens valve 13, permitting oil to flow from the reserve tank 15 into the crank case 10. The valve 13 remains open as long as the bridge circuit is unbalanced in a direction which sends a signal to the amplifier 33. When the oil level reaches the thermistor 17, the oil cools the thermistor bead 17 and the bridge circuit is rapidly changed to be unbalanced in the other direction thereby cutting off the signal to the amplifier 33 and reducing the solenoid current to zero. This cuts off the flow of oil. At this time the lamp 16 goes out and the operator may start the engine to increase the oil pressure and eliminate the flow of current from the battery 21. As soon as the current is reduced to zero, the SCR 38 is made nonconducting and the entire circuit is normalized.

A thermistor having a positive temperature coefficient of resistance can be used by connecting such a thermistor into the bridge at the position occupied by resistor 28 and replacing thermistor 17 by a suitable resistance. While the sensing device is designed mainly for use with liquids such as oil and water, it can be used with fluent solid materials such as wheat, powdered teflon, or any other free flowing powdered material.

Having thus fully described the invention, what is claimed as new and desired to be secured by Letters Patent of the United States is:

1. A device for sensing and replenishing the liquid level in a main tank wherein said main tank is connected to a machine to be lubricated comprising a first liquid containing main tank, a reserve liquid containing tank, a fluid bearing line interconnecting the main and reserve tanks, an oil pump connected between the main tank and the machine for circulating the oil therethrough, an oil pressure switch coupled to the oil pump, liquid level sensing means comprising a four armed bridge circuit, a thermistor in one of said arms, said thermistor disposed within the main tank at a desired level, a source of potential connected to the thermistor to raise the temperature of the said thermistor to a desired point, a normally closed solenoid valve in the fluid bearing line, a winding in the solenoid valve coupled to the bridge circuit, switch means for energizing the bridge circuit whereby the solenoid valve is opened to admit liquid from the reserve tank to the main tank in the event the liquid level is below the desired level, said switch means being operated by the oil pressure switch to open the switch whenever the oil pressure exceeds a predetermined value.

\* \* \* \* \*